(12) United States Patent
Warrick

(10) Patent No.: US 10,771,635 B2
(45) Date of Patent: *Sep. 8, 2020

(54) APPARATUS FOR CONFIGURING A USER DEVICE FOR COMMUNICATION WITH A COMMUNICATION SERVER AND METHOD THEREOF

(71) Applicant: Bullhead Innovations Ltd., Calgary (CA)

(72) Inventor: Peter S. Warrick, Calgary (CA)

(73) Assignee: Bullhead Innovations Ltd., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/699,457

(22) Filed: Nov. 29, 2019

(65) Prior Publication Data
US 2020/0106887 A1   Apr. 2, 2020

Related U.S. Application Data

(63) Continuation of application No. 16/410,746, filed on May 13, 2019, now Pat. No. 10,530,938, which is a (Continued)

(51) Int. Cl.
H04M 15/00 (2006.01)
H04M 15/34 (2006.01)
H04L 29/08 (2006.01)

(52) U.S. Cl.
CPC ...... *H04M 15/7556* (2013.01); *H04L 67/141* (2013.01); *H04M 15/34* (2013.01); *H04M 15/63* (2013.01); *H04M 15/715* (2013.01)

(58) Field of Classification Search
CPC ........ H04W 12/06; H04L 67/42; H04L 67/02; H04L 67/14; H04L 67/142;
(Continued)

(56) References Cited

U.S. PATENT DOCUMENTS 9,363,373 B2   6/2016   Abnett et al.
9,674,692 B2 *  6/2017   Quiros ................ H04M 1/2535
(Continued)

*Primary Examiner* — Nizar N Sivji
(74) *Attorney, Agent, or Firm* — ATMAC Patent Services Ltd.; Andrew T. MacMillan

(57) ABSTRACT

An apparatus enables communication between a user device and a communication server. The apparatus receives a device identifier of the user device and determines after searching a device-to-token database that the device identifier is not associated with any device communication token. The apparatus activates a predetermined application on the user device, and thereafter receives a device communication token of the predetermined application. A mapping of the device communication token with the device identifier is stored in the device-to-token database after which a communication account is created for the user device on a communication server. A login credential for the communication account is sent to the user device in a message addressed to the predetermined application and transmitted via a message server. The predetermined application on the user device receives the message, and thereafter automatically logs in to the communication server according to the login credential in the message.

20 Claims, 3 Drawing Sheets

Related U.S. Application Data continuation of application No. 16/043,662, filed on Jul. 24, 2018, now Pat. No. 10,341,497.

(60) Provisional application No. 62/608,071, filed on Dec. 20, 2017, provisional application No. 62/540,621, filed on Aug. 3, 2017.

(58) Field of Classification Search
CPC ............ H04L 67/2861; H04M 3/4234; H04M 3/42365; H04M 3/42246; H04M 1/72533; H04M 15/7556; H04M 15/34; H04M 15/715

See application file for complete search history.

(56) References Cited

U.S. PATENT DOCUMENTS

| | | | |
|---|---|---|---|
| 9,712,673 B2 | 7/2017 | Abnett et al. | |
| 9,854,093 B2 | 12/2017 | McComb et al. | |
| 10,341,497 B2 | 7/2019 | Warrick | |
| 10,530,938 B2 | 1/2020 | Warrick | |
| 2007/0253545 A1* | 11/2007 | Chatterjee | H04M 3/42263 379/211.02 |
| 2010/0100928 A1* | 4/2010 | Gasparini | H04L 9/3213 726/1 |
| 2010/0234009 A1* | 9/2010 | Antani | H04M 3/42178 455/419 |
| 2012/0166628 A1* | 6/2012 | Kullos | H04L 41/5016 709/224 |
| 2015/0156321 A1 | 6/2015 | Abnett et al. | |
| 2015/0156616 A1* | 6/2015 | McComb | G06F 16/2455 455/417 |
| 2015/0254726 A1* | 9/2015 | Cassidy | G06Q 30/0269 705/14.58 |
| 2016/0255197 A1 | 9/2016 | Abnett et al. | |
| 2017/0017947 A1* | 1/2017 | Robinton | G06Q 20/209 |
| 2018/0034964 A1 | 2/2018 | McComb et al. | |
| 2019/0045067 A1 | 2/2019 | Warrick | |

* cited by examiner

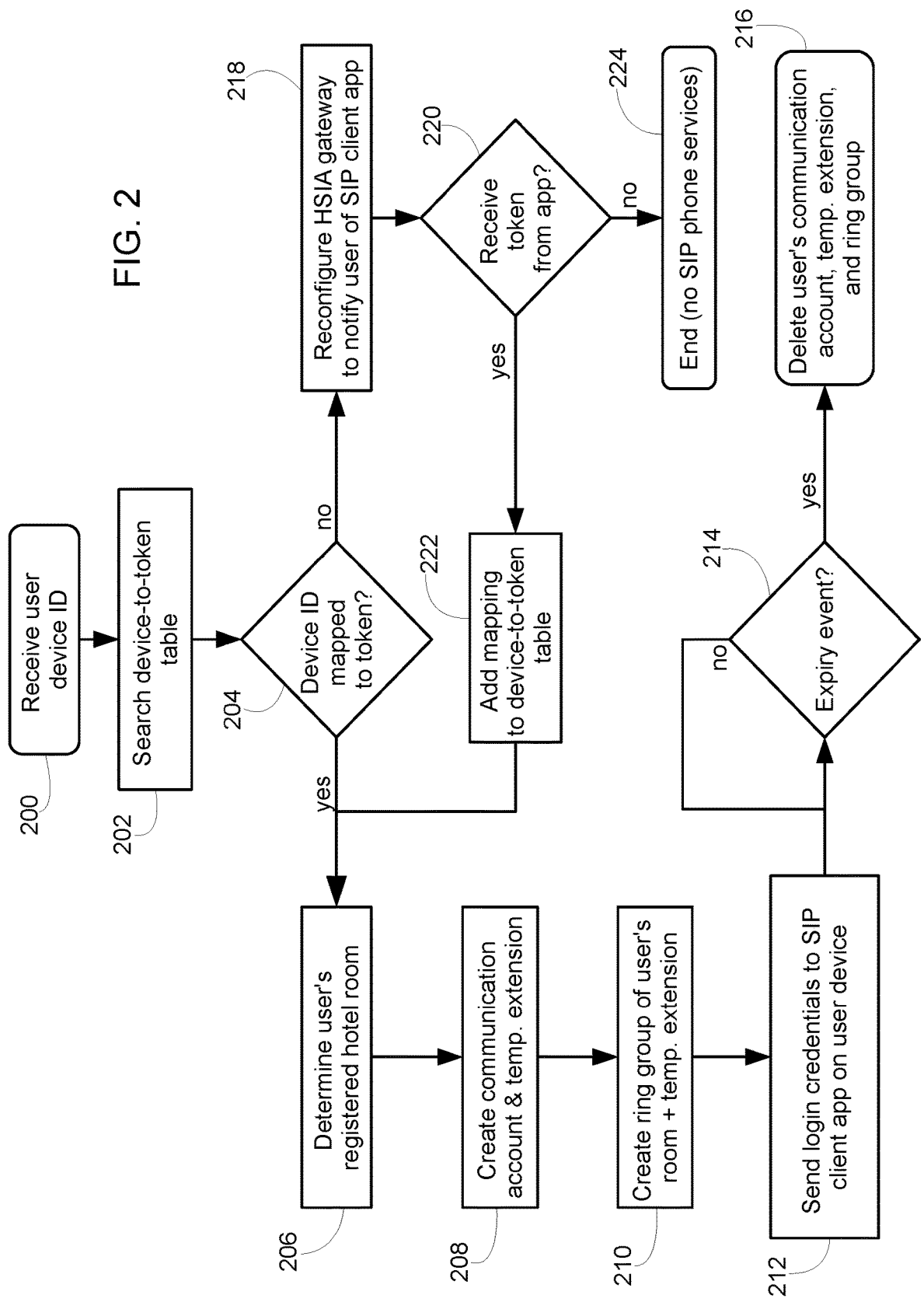

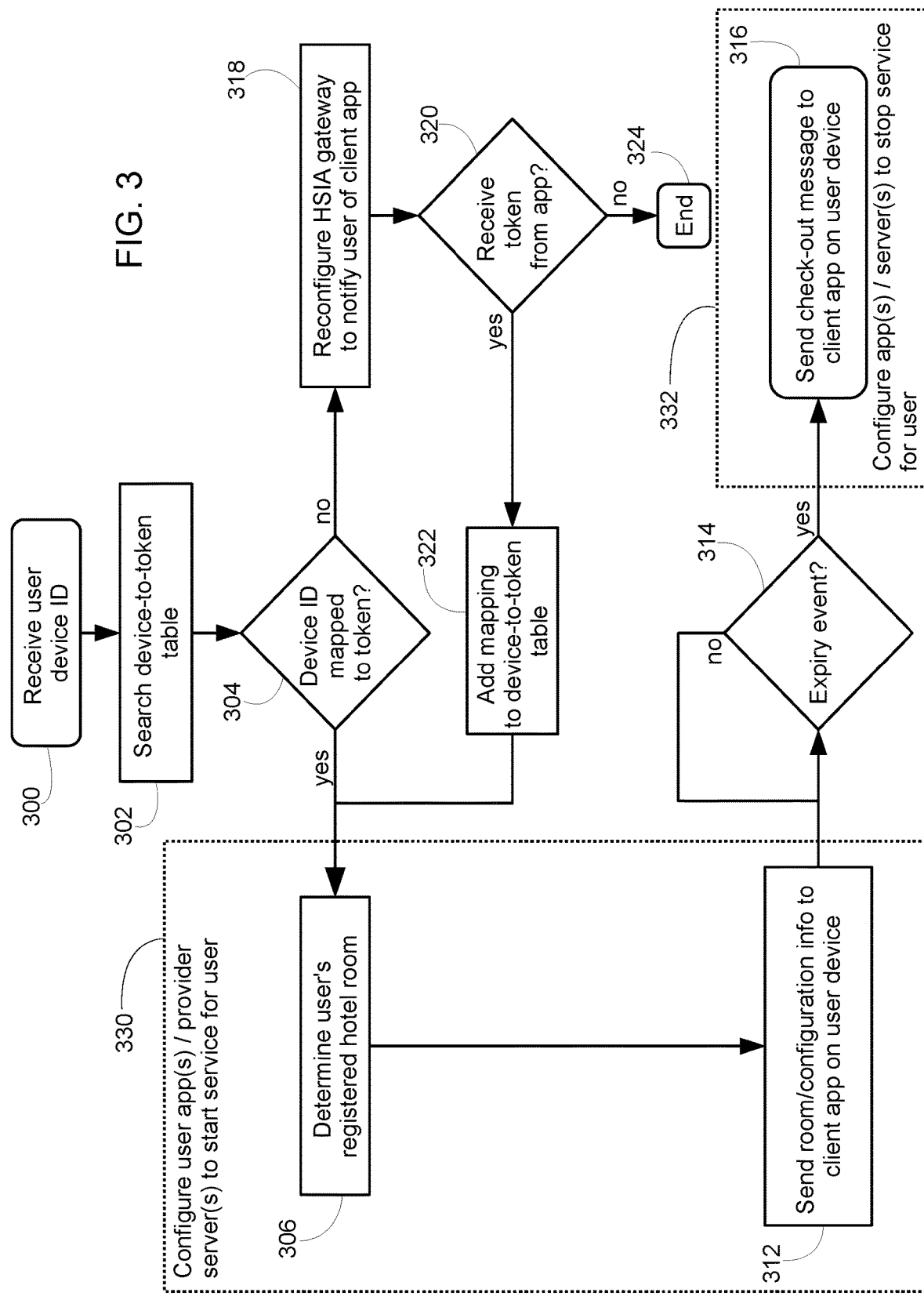

APPARATUS FOR CONFIGURING A USER DEVICE FOR COMMUNICATION WITH A COMMUNICATION SERVER AND METHOD THEREOF

CROSS-REFERENCE TO RELATED APPLICATIONS

This application is a continuation of U.S. patent application Ser. No. 16/410,746 filed on May 13, 2019, which is a continuation of U.S. patent application Ser. No. 16/043,662 filed on Jul. 24, 2018, which claims the benefit of priority of U.S. Provisional Application No. 62/540,621 filed Aug. 3, 2017 and U.S. Provisional Application No. 62/608,071 filed Dec. 20, 2017. All of these applications are incorporated herein by reference.

BACKGROUND OF THE INVENTION

(1) Field of the Invention

The invention pertains generally to communication systems. More specifically, the invention relates to automatically configuring session initiation protocol (SIP) servers and client devices for guest usage at hospitality establishments.

(2) Description of the Related Art

Before the invention of the cell phone, private branch exchange (PBX) systems employing per-call billing were typically revenue generators for hotels. Take for example the situation where a guest without a cell phone is staying at a hotel and needs to make a phone call; the most convenient option is for the guest to use the phone provided in the guest's hotel room. To profit from this convenience, most hotels automatically charge for long distance calls made via the in-room phone, and some enterprising hotels charge for local calls in a similar manner. In-room phone charges typically show up as an itemized list along with the guest's folio at checkout, and calls may be charged on either a per-minute or per-usage basis.

Although many hotels currently charge for calls made by guests via in-room phones, hotel PBX systems are no longer the cash cows they used to be. In today's age of ubiquitous mobile phones, guests typically arrive with their own phone in pocket. The in-room phone is shunned by a guest equipped with a mobile phone except perhaps to call the front desk or to directly dial another guest room. Especially for heavy phone users, as long as there is sufficient cell phone signal coverage and the phone is still on its 'home' cellular network to avoid roaming charges, guests almost always prefer to use their own mobile phone rather than the in-room phone for both incoming and outgoing calls. From the guest's point of view, there is often no advantage and several disadvantages with using the in-room phone rather the guest's personal mobile phone. As such, the legacy hotel PBX system is often unable to compete with a guest's personal mobile phone.

Recognizing these trends along with the rise of popularity of mobile phones, some hotel insiders predicted that the in-room guest phone would simply disappear. The rational was as follows: if guests are making minimal use of the in-room phone because everyone nowadays has their own cell phone, why not save some money by not providing a phone in each room? Contrary to these predictions and despite low usage numbers, the in-room guest phone is still here for emergency preparedness. A guest without a functioning cell phone will expect there to be a working in-room phone in an emergency situation such as a fire. Other hospitality-specific functionality such as wake up calls also make use of the in-room phones.

As such, the current state of the art is that hotels generally incur costs to install and maintain a PBX system and an in-room phone in each guest room, but this equipment at best generates only small profit for the hotel and more typically generates losses because it is rarely utilized by guests.

BRIEF SUMMARY OF THE INVENTION

According to an exemplary embodiment of the invention there is disclosed an association server in a communication system. The association server includes a communication port, a storage device storing a plurality of software instructions, and one or more processors coupled to the communication port and the storage device. By the one or more processors executing the software instructions loaded from the storage device, the one or more processors are thereby configured to receive a device identifier of a user device and search a device-to-token database in order to determine whether the device identifier is currently associated with any device communication token. In response to determining that the device identifier is associated with a device communication token, the one or more processors are configured to create a communication account for the user device on a communication server, and send a login credential for the communication account to the user device in a message transmitted via a message server. The message is addressed by the device communication token to a predetermined application installed on the user device. The predetermined application on the user device receives the message from the message server, and thereafter automatically logs in to the communication server according to the login credential included in the message.

According to an exemplary embodiment of the invention there is disclosed a communication system including one or more computer servers and a storage device storing a device-to-token database. The one or more computer servers receive a device identifier of a user device. The one or more computer servers further search the device-to-token database in order to determine whether the device identifier is currently associated with any device communication token. In response to determining that the device identifier is associated with a device communication token, the one or more computer servers create a communication account for the user device on a communication server, and send a login credential for the communication account to the user device in a message transmitted via a message server. The message is addressed by the device communication token to a predetermined application installed on the user device. The predetermined application on the user device receives the message from the message server, and thereafter automatically logs in to the communication server according to the login credential included in the message.

According to an exemplary embodiment of the invention there is disclosed a method of association in a communication system. The method includes receiving a device identifier of a user device, searching a device-to-token database in order to determine whether the device identifier is currently associated with any device communication token, and in response to determining that the device identifier is associated with a device communication token, creating a communication account for the user device on a communication server. The method further includes sending a login credential for the communication account to the user device in a message transmitted via a message server. The message is addressed by the device communication token to a predetermined application installed on the user device. The predetermined application on the user device receives the message from the message server, and thereafter automatically logs in to the communication server according to the login credential included in the message.

In an exemplary embodiment, a SIP association server creates a communication account, extension, and password for a user device and sends this information to a communication server to configure it to create a new account. The SIP association server then sends login credentials for the new account to user's mobile device thereby allowing the user's mobile device to access the newly created communication account. The SIP association server may optionally create a ring group and associate a hotel room phone extension and this new device extension together so that both the SIP client on the user's phone and the in-room phone in the user's registered guest room will ring upon an incoming call to either the in-room phone's extension and/or the new device extension.

According to another exemplary embodiment of the invention there is disclosed an apparatus for enabling communication between a user device and a communication server in a communication system. The apparatus includes a communication port, a storage device storing a plurality of software instructions, and one or more processors coupled to the communication port and the storage device. By the one or more processors executing the software instructions loaded from the storage device, the one or more processors are thereby configured to receive a device identifier of the user device and search a device-to-token database in order to determine whether the device identifier is associated with any device communication token. In response to determining that the device identifier is not associated with any device communication token, the one or more processors are further configured to send a message to the user device to thereby cause the user device to activate a predetermined application. The one or more processors are further configured to receive a device communication token of the predetermined application from the user device after the predetermined application has been activated and store a mapping of the device communication token with the device identifier in the device-to-token database, wherein the mapping represents an association of the device identifier with the device communication token that is utilized by the one or more processors in determining whether the user device is authorized to communicate with the communication server. The one or more processors are further configured to create a communication account for the user device on the communication server and send a login credential for the communication account to the user device in a notification message transmitted via a message server. The notification message is addressed by the device communication token to the predetermined application on the user device. The predetermined application on the user device receives the notification message from the message server, and thereafter automatically logs in to the communication server according to the login credential included in the notification message.

According to yet another exemplary embodiment of the invention there is disclosed a method of enabling communication between a user device and a communication server in a communication system. The method includes receiving a device identifier of a user device, searching a device-to-token database in order to determine whether the device identifier is currently associated with any device communication token, and in response to determining that the device identifier is not associated with any device communication token, sending a message to the user device to thereby cause the user device to activate a predetermined application on the user device. The method further includes receiving a device communication token of the predetermined application from the user device after the predetermined application has been activated, storing a mapping of the device communication token with the device identifier in the device-to-token database, wherein the mapping represents an association of the device identifier with the device communication token utilized by one or more processors in determining whether the user device is authorized to communicate with the communication server. The method further includes creating a communication account for the user device on the communication server and sending a login credential for the communication account to the user device in a notification message transmitted via a message server. The notification message is addressed by the device communication token to the predetermined application on the user device. The predetermined application on the user device receives the notification message from the message server, and thereafter automatically logs in to the communication server according to the login credential included in the notification message.

An exemplary benefit of certain embodiments of the invention is that a traveler who is out and about may make local calls for free from any tourist or other location that has Wi-Fi access.

Another exemplary benefit of certain embodiments is that hotels may increase usage and better monetize their phone systems by adding residual revenue per room as users opt to utilize the hotel's SIP client app to make local calls using the hotel's phone system accessed from the user's own mobile phone.

These and other advantages and embodiments of the present invention will no doubt become apparent to those of ordinary skill in the art after reading the following detailed description of preferred embodiments illustrated in the various figures and drawings.

BRIEF DESCRIPTION OF THE DRAWINGS

The invention will be described in greater detail with reference to the accompanying drawings which represent preferred embodiments thereof:

FIG. 2 shows a flowchart of a method of associating a user device with a communication account on a communication server according to an exemplary embodiment.

FIG. 3 is a flowchart of steps of an automatic room association and app configuration process for simplifying the configuration of an app running on a user's device as the user moves between different hospitality establishments according to an exemplary embodiment.

DETAILED DESCRIPTION

Figure 1:
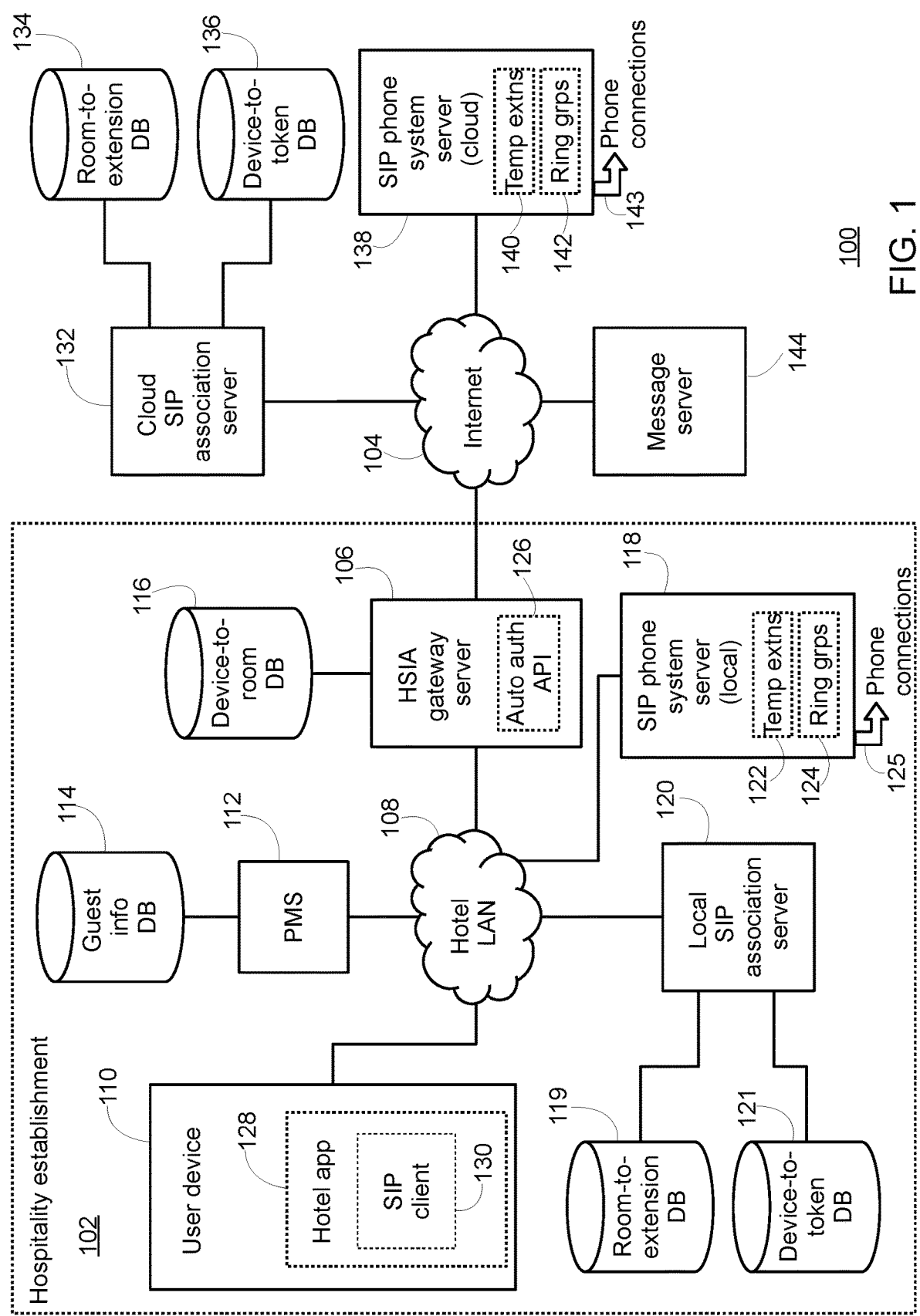
FIG. 1 shows a communication system according to an exemplary embodiment of the invention.

FIG. 1 shows a communication system 100 according to an exemplary embodiment of the invention. The system 100 includes a number of components at a hospitality establishment 102 coupled to the Internet 104. In this example, the hospitality establishment 102 is a hotel and includes a high-speed internet access (HSIA) gateway server 106 acting as an access controller controlling access between the Internet 104 and a local area network (LAN) at the hotel. A user device 110 at the hotel such as a mobile phone used by a hotel guest is coupled to the hotel LAN 108 via a wired connection (e.g., Ethernet) or a wireless connection (e.g., Wi-Fi). A property management system (PMS) 112 is coupled to the LAN 108 for managing guest room assignments and billing at the hotel. A device-to-room database 116 is coupled to the HSIA gateway server 106 for tracking with which room at the hotel guest devices such as user device 110 are associated.

A local Session Initiation Protocol (SIP) phone system server 118 is installed at the hospitality establishment in this example and is coupled to the hotel's LAN 108. A local SIP association server 120 is likewise provided onsite and is coupled to the hotel's LAN 108. The local SIP association server 120 is coupled to local versions of a room-to-extension database 119 and a device-to-token database 121. The local SIP server 118 includes a storage device therein storing a list of temporary extensions 122 and their associated user credentials. The local SIP phone server 118 further includes a list of ring groups 124, which cause multiple phone extensions in a single group to ring upon an incoming call to that group. The local SIP phone server 118 is coupled to one or more external phone connections 125 such as plain old telephone service (POTS) connections, public switched telephone network (PSTN) gateway to the hotel 102 and/or SIP trunking lines connected via the hotel LAN 108 and the Internet 104.

The user device 110 has installed thereon a hotel application 128, and the hotel app 128 includes a SIP client 130 for making and receiving SIP calls using the app 128 in conjunction with system 100. A message server 144 is also coupled to the Internet 104 for sending messages to the hotel app 128 on the user device 110.

The system 100 in this configuration further includes a cloud SIP association server 132 that is coupled to cloud versions of a room-to-extension database 134 and a device-to-token database 136. A cloud SIP phone system server 138 is also coupled to the Internet 104 and includes a list of temporary extensions 140 and their associated user credentials. A list of ring groups 142 are also stored on the cloud SIP phone system server 138. The cloud SIP phone system server 138 is coupled to one or more external phone connections 143 such as plain old telephone service (POTS) connections, public switched telephone network (PSTN) gateway to the hotel 102 and/or SIP trunking lines via the Internet 104.

The cloud versions of the SIP association server 132, room-to-extension database 134, device-to-token database 136, and SIP phone system server 138 work in conjunction with their similarly named local components 120, 119, 121, 118. In some embodiments, these local and cloud devices are one in the same; however, for purposes of explanation the system 100 will first be described with operations as performed from the point of the local components 120, 119, 121, 118. As will be explained further later on, it is to be understood that, in other configurations, one or more of the cloud components 132, 134, 136, 138 may be substituted for the corresponding local component 120, 119, 121, 118, and vice versa. Both separate cloud and local components as illustrated in FIG. 1 may also be utilized together in a single system 100 in some embodiments.

FIG. 2 shows a flowchart of a method of associating the user device 110 of FIG. 1 with a SIP account on the local SIP phone server 118 according to an exemplary embodiment. In some embodiments, the steps of FIG. 2 are performed by one or more processors of the local SIP association server 120. In other embodiments, the steps of FIG. 2 are performed by one or more processors of any combination of the above-described components of system 100 such as the local components at hospitality establishment 102 and/or the various cloud components coupled to the Internet 104.

The one or more processors may be included in one or more central processor units (CPUs) of one or more computer servers acting to perform the illustrated steps. In the following description, the plural form of the word "processors" will be utilized as it is common for a CPU of a computer server to have multiple processors (sometimes also referred to as cores); however, it is to be understood that a single processor may also be configured to perform the described functionality in other implementations. The steps of the flowchart are not restricted to the exact order shown, and, in other configurations, shown steps may be omitted or other intermediate steps added.

The following description of FIG. 2 assumes the steps are performed by processors of either the local SIP association server 120 and/or the cloud SIP association server 132 for clarity of explanation of some embodiments; however, as stated above, it is to be understood that steps may be performed by processors of other components in other embodiments.

The process begins at step 200 when a component such has the local SIP association server 120 and/or cloud SIP association server 132 receives a device identifier such as a MAC address from the user device 110.

The device identifier may be sent to the SIP association server 120, 132 directly by the user device 110. For instance, upon a guest arriving at the hotel and connecting their user device 110 to the hotel's LAN 108, the hotel app 128 running on the user device 110 may recognize the hotel LAN 108 by checking for the existence of a local SIP association server 120. This may be done by the hotel app 128 making a multicast domain name service (mDNS) query to determine whether there is a server on the hotel LAN 108 that is acting as the local SIP association server 120. In another example, the local SIP association server 120 may periodically and/or repeatedly broadcast/multicast an announcement of its existence to devices on the hotel LAN 108. Upon detecting the existence of the local SIP association server 120, the hotel app 128 sends its MAC address to the local SIP association server 120.

The app 128 may already know its MAC address or be able to directly retrieve the MAC address or other device identifier of the user device 110 from the operating system and/or the underlying communication hardware in order to send to the SIP association server 120, 132 at step 200. Android™ devices for example can get their own MAC addresses within the app 128. Alternatively, the user device 110 may query another device on the LAN 108 such as querying the HSIA gateway server 106 to ask the server 106 to report back the MAC address of the user device 110. The HSIA gateway server 106 or another device on the LAN 108 sends back the MAC address to the user device 110 in response to the query. The MAC address may then be stored within the app 128 so that going forward the app 128 can always directly report its MAC address to the SIP association server 120, 132 at step 200. Thereafter, the MAC address along with a device communication token of the user device 110 (described further below) may both be reported to the SIP association server 120, 132 by the app 128 upon first arrival at the hotel and/or upon the app 128 being run for the first time. This may occur at either or both of steps 200 and/or 220 of FIG. 2.

The app 128 running on a suitable mobile operating system such as Android could also be run outside of the hotel at a local off the hotel LAN 1108 for the first time, for example at the user's home. The app 128 at the point it is first run could send both its MAC address (or other device identifier) and its device communication token to the cloud SIP association server 132 for storage in the device-to-token database 136, for example. Once at the hotel 102 and on the local LAN 108, the guest's user device 110 will be seen by the local SIP association server 120 such as when the user device 110 makes a DHCP request or sends other network traffic on the local LAN 108. The local SIP association server 120 thereby receives the MAC address of the user device 110 and queries the cloud SIP association server 132 with the MAC address to retrieve the already stored and associated device communication token for the user device 110.

In other embodiments, the hotel app 128 and/or the user device 110 does not need to be involved in sending the MAC address at step 200 upon connection of the user device 110 to the hotel LAN 108. Instead, the MAC address or other device identifier of the user device 110 may be sent to the SIP association server 120, 132 by a source different than the user device 110. In an exemplary embodiment, when the user of the user device 110 logs in at a login portal of the HSIA gateway server 106, the HSIA gateway 106 determines the MAC address of the user device 110 by inspecting network traffic received from the user device 110. The gateway 106 then informs either the local SIP association server 120 and/or the cloud SIP association server 132 of the MAC address of the user device 110.

Having the local gateway 106 at the hotel detect the MAC address of the user device 110 may be particularly beneficial in embodiments utilizing Apple® iOS® based devices in conjunction with the cloud SIP association server 132. iOS® currently does not allow apps 110 to determine the MAC address of the user device 110 on which the app is running. Likewise, a cloud-based SIP association server 132 cannot usually see the MAC address of the user device 110 only by inspecting packets sent by the user device 110 because the packets have traversed the Internet 104 and the originating MAC address is lost. For this reason, the gateway server 106 may extract the MAC address of the user device 110 from local network traffic sent by the user device 110 on the hotel LAN 108 and then transmit the detected MAC address to the cloud SIP association server 132. As another benefit, when another device such as the HSIA gateway server 106 reports the MAC address (or other device identifier) of the user device 110, it is not required that the app 128 be running on the user device 110 at the time the user device 110 arrives or is utilized on the hotel LAN 108. IP-traffic traceroute techniques may also be performed by the HSIA gateway server 106 at the hotel in order to traverse a network map of various switches and network equipment on the LAN 108 by following the path of the IP address of the user device 110. In this way, the HSIA gateway server 106 can find an originating switch (other access node) and to query that device to obtain the source MAC address (or other device identifier) of the user device 110. For example, the HSIA gateway server 106 may access a command line or other type of remote interface of the originating switch to look up the MAC address associated with the IP address of the user device 110.

At step 202, the SIP association server 120, 132 searches its device-to-token database 121, 136 in order to try and find whether the MAC address (or other device identifier) received/determined at step 200 is currently associated with any device communication token. The device-to-token database 121, 136 includes a mapping of device identifiers such as MAC addresses of user devices 110 to device communication tokens. In some cases, each MAC address may be associated to a single, unique device communication token. Alternatively, each MAC address may be associated with multiple device communication tokens as the tokens will be different per app on that device 110. Device communication tokens include well-known push notification tokens utilized to address push notification messages to a particular instance of an application running on a particular mobile device and for which a particular user is currently logged in. For instance, Apple®, Google®, and Microsoft® all have push notification tokens allowing developers to push notification messages via their respective push message servers 144 in order to send messages to and notify app users of relevant events. As push notification tokens and the methods of sending push notification messages using these tokens on various app platforms are well understood in the art, further description is omitted herein for brevity. Other types of device communication tokens instead of or in addition to push notification tokens may be utilized in other embodiments. For example, any type of address for uniquely identifying a particular instance of the hotel app 128 associated with a particular user may be employed as the device communication token in other embodiments.

At step 204, the SIP association server 120, 132 determines whether there is a particular device communication token associated with the MAC address (or other device identifier) received/determined at step 200. When yes, control proceeds to step 206; otherwise, control proceeds to step 218.

At step 206, the SIP association server 120, 132 determines the user's registered hotel room. There are number of ways this may be done in different embodiments.

The device-to-room database 116 is utilized by a login portal provided by the HSIA gateway server 106 to correlate guest devices brought to the hotel with registered rooms at the hotel. For instance, the user device 110 may be brought to the hotel by a guest who is assigned to a particular room. When the guest utilizes user device 110 to sign in at the login portal, the gateway server 106 may confirm the guest's identity with the PMS 112 and store a record of the guest room as being associated with the user device 110 in the device-to-room database 116. In some embodiments, the device-to-room database 116 is both local and in the cloud. For instance, the HSIA gateway server 106 may provide to the SIP association server 120, 132 the room number data upon the user logging in, and then the SIP association server 120, 132 stores this data in a cloud device-to-room database 116. The SIP association server 120, 132 may also query the device-to-room database 116 in the cloud such as stored at a central database server.

Given the MAC address (or other device identifier), the HSIA gateway server 106 may simply look up the user's registered guest room from the device-to-room database 116. As previously mentioned, users may be required to log in at the HSIA gateway 106 in order to obtain Internet access. Part of the log in process may involve the user inputting their room number. Authentication performed by the login portal may involve confirming the user's last name or other personal identification information matches the currently registered room of the specified room number in the property management system (PMS) 112. This type of authentication is referred to as "PMS authentication" and is well known in the art of high speed Internet access for hospitality establishments. Since the HSIA gateway server 106 has already performed PMS authentication as a part of the HSIA login process, the gateway 106 may store a record of the room number with which each user device 110 is associated. The gateway 106 may then send a room number message to the SIP association server 120, 132 either together with the MAC address at step 200 or separately such as when the MAC address is provided at step 200 by another device different than the gateway 106.

In other embodiments, the SIP association server 120, 132 queries one or more other devices in order to determine the room number associated with the MAC address (or other device identifier) received at step 200. For instance, the SIP association server 120, 132 may query a device-to-user database (not shown) in order to lookup the last name or other personal identification information of the user that is associated with the MAC address (or other device identifier) received at step 200. For instance, user devices may be mapped to user full names, loyalty program identifiers at a user profile server. Once the user's name or other identifying information is found, the SIP association server 120, 132 may query the property management server (PMS) 112 at the hotel 102 in order to look up which room number is associated with that user. In yet other embodiments, the SIP association server 120, 132 queries the gateway 106 at the hotel 102 in order to ask for the room number associated with the MAC address (or other device identifier) received at step 200.

At step 208, the SIP association server 120, 132 creates a new communication account for the SIP client 130 of hotel app 128 to log in at the SIP phone system server 118, 138. Again, the communication account could be created on either one or both of the local and cloud versions of the phone system server 118, 138 depending on which of the two (or both) are present in the system 100 according to different embodiments.

Creation of the communication account at step 208 involves registering a unique username and password for the SIP client 130 to log in to the SIP phone system server 118, 138. The SIP phone system server 118, 138 is implemented in some embodiments by an Asterisk™ communication server for providing SIP phone and PBX services. When creating the communication account, in some embodiments the SIP association server 120, 132 sets the unique username of the account to the MAC address or other device identifier received at step 200. Other unique usernames may also be utilized such as the device communication token found associated with the device identifier at step 204. Any unique value may be utilized. For instance, the SIP username may be a randomly generated universally unique identifier (UUID) associated to the user device 110 in the account information database of the SIP phone system server 118. Likewise, the password may be any random or otherwise hard to guess combination of characters to prevent unauthorized parties from logging in even if the MAC address or other username of the account is known.

Another part of creating the communication account at step 208 involves the creation and/or assignment of a temporary SIP phone extension 122, 140 to the new communication account. The temporary extension 122, 140 is the phone extension utilized by the SIP phone system server 118, 138 to direct calls to/from the new communication account. In some embodiments, the temporary extension 122, 140 is a unique phone extension identifier assigned by the SIP phone system server 118, 138 upon account creation. The temporary extension 122, 140 may be a numerical extension such that it may be directly dialed by an external caller via phone connections 125, 143. Alternatively, the temporary extension 122, 140 may be an alphanumeric or other identifier that is only addressable within and by the SIP phone system server 118, 138. For instance, outgoing calls made by the SIP client 130 will be associated with the temporary extensions 122, 140 but the outgoing caller ID value when the call is routed to the phone connections 125, 143 may be dynamically set by the phone server 118, 138 to be another more useful value such as the user device 110 phone number, the extension of the in-room phone in the user's assigned hotel room, or even the guest's name.

At step 210, the SIP association server 120, 132 creates a ring group 124, 142 between one or more phone extensions of the user's registered hotel room and a temporary extension associated with the new communication account created at step 208. For instance, assuming the user device 110 was determined to be associated with room number No. "101" of the hotel 102 at step 206, at step 210 the SIP association server 120, 132 creates a ring group 124, 142 containing both extension No. No. "101" corresponding to room No. "101"'s phone number and the temporary extension for the communication account. The temporary extension for the communication account in some embodiments is equivalent to the account's username, which in some embodiments is the same as the device identifier of the user device 110 received at step 200. However, any unique temporary extension may be associated with the newly created communication account at step 208.

The operation of established ring groups 124, 142 are well known in the art, but for clarity of description herein the ring groups 124, 142 cause the SIP phone system server 118, 138 to twin incoming calls such that all extensions in the ring group 124, 142 are notified of the incoming call. In other words, once the ring group 124, 142 has been created at step 210, an incoming call for the extension No. "101" corresponding to the in-room phone in hotel room number No. "101" would also ring at the extension associated with the new communication account created at step 208. Said more clearly, an incoming call to hotel room No. "101" would cause both room No. "101"'s in-room phone and the SIP client 130 to ring. This is because the SIP phone system server 118, 138 would notify both extensions (i.e., the in-room phone in room No. "101" and the SIP client 130 on user device 110) since both extensions are in the same ring group 124, 142.

As for how the SIP association server 120, 132 and the SIP phone system server 118, 138 know which specific extension number is to be included in the ring group 124, 142, this may be determined by one of the SIP association server 120, 132 querying the room-to-extension database 119, 134. This room-to-extension database correlates hotel room identifiers specified in either or both of the guest info database 114 and/or the device-to-room database 116 with specific phone extension numbers. In some cases, the extension for a particular room will be the same as the room number itself. However, it may also be the case that the phone extension for a particular hotel room may be different or unrelated to the room identifier. For instance, a conference room in the hotel may have a name such as "Inspire Room" and may have a phone extension No. of "1234". Likewise, a hotel suite may have multiple in-room phones each with different dialable extension numbers.

When a room has multiple in-room extensions, a single ring group 124 may be created to add all extensions together with the temporary extension 122 for the user device 110. Alternatively, a separate ring group 124 may be created for each in-room extension, such that all in room-extensions are separately dialable, but an incoming call to any will also cause the SIP client 130 on the user's mobile phone 110 to ring. Any combination of ring groups 124 and in-room extensions may be used in different embodiments.

At step 212, the SIP association server 120, 132 sends the login credentials associated with the new communication account created at step 208 to the hotel app 128 running on the user device 110. The login credentials are sent in some embodiments by the SIP association server 120, 132 first generating a push notification message including those details, and the push notification message is transmitted to the user device 110 through an external notification service accessed on message server 144. The notification message is addressed by the device communication token determined at step 204 such that it will be received only by the hotel app 128 installed on the user device 110. A silent notification message may be utilized such that the message does not show on the user device 110 to the user. In some embodiments, the notification message further includes a network address (e.g., Internet Protocol IP address) of the SIP phone system server 118, 138 on which the account was created. This is beneficial when the communication system 100 includes a plurality of different SIP phone system servers 118, 138 such as different servers located or associated with each different hotel or other hospitality establishment 102.

Upon receipt of the notification message, the operating system on user device 110 automatically activates the hotel app 128 in order that the app 128 can receive the notification message. This is beneficial because the user is not required to manually open the hotel app 128. As long as the app 128 is installed on the user device 110 and the user's login state is preserved with the app 128, the notification service will deliver the notification message to the user device 110 when network connectivity is available, and the user device 110 will deliver the message to the app 128.

The login credentials and other setup information related to the new communication account may also be sent at step 212 utilizing other types of messages in addition to or instead of push notification messages in some embodiments. For instance, any desired method of sending messages to an app 128 may be utilized at step 212 such as background message services, push messages, messages pulled or otherwise retrieved by the user device 110, etc. In general, configuration data enabling the hotel app 128 to log in to the newly created communication account is sent from a server such as the SIP phone system server 118, 138 to the user's device 110 so that it can be received by the app 128. The message with the required configuration data may be sent directly over the Internet 104 and/or hotel LAN 108, or may involve transmission via an external messaging server 144.

Upon receiving the login credentials, the hotel app 128 automatically configures the SIP client 130. This includes setting up the SIP client 130 to log in to the appropriate one or more SIP phone system servers 118, 132 utilizing the login credentials of the new communications account set up at step 208.

Once logged in, the SIP client 130 behaves very much like a typical SIP client application such that the user of the user device 110 may place outgoing calls via the SIP client 130 and may receive incoming calls via the SIP client 130. The transactions between the SIP client 130 and the SIP phone system server 118, 138 follow standard SIP protocols and a detailed explanation of general SIP operations is therefore omitted herein for brevity.

The ring groups described in step 210 are optional and may be omitted or only utilized for some users/guest rooms in other embodiments. When not utilizing a ring group, a person with the app 128 can call another person with the app 128 and specify right in the app whether to call the room phone or the other user's user device 110. Allowing separate selection of whether to call the in-room phone and/or the user device 110 associated with the destination extension can be useful for when multiple colleagues are sharing a single room.

It is worth highlighting that regardless of the location of the user device 110, as long as network connectivity is available such as while at any free or public hotspot, the user of the user device 110 may open SIP client 130 and make a call. The call will be placed through the SIP client 130 communicating over the network 108, 104 with the SIP phone system server 118, 138 and therefore will not result in any roaming charges or phone fees for the user device 110 even if the user device 110 is not located on its home mobile network or within its home local calling area. Likewise, as long as the placed calls are local to the SIP phone system server 118, 138, the server 118, 138 will not incur any long-distance charges. Taking these two benefits together, different service packages may be offered to help monetize system 100 for the hotel 102. For instance, while checked in to the hotel, a user of the user device 110 may be offered unlimited local SIP calls placed from SIP client 130 to destinations within a physical region around the hotel 102 that corresponds to free local calls. This service may be offered to the hotel guest for an additional fee that is billed to the guest room via the PMS 112, for example. In this way, the guest can easily call any number of local tourist destinations at minimal cost using their familiar user device 102, and the hotel 102 can increase usage and further monetize their communication system 100. In another monetization scheme, each incoming and/or outgoing call placed via SIP client 110 may be individually billed to the guest's room via PMS 112. Other billing options such as prepaid credit card or postpaid credit card may be employed in other embodiments.

Caller ID of outgoing calls may be set to either the hotel's main number, the user's mobile phone number, and/or the direct dial extension number of the user's registered room. In some embodiments, the selection of which caller ID value or to have no caller ID value—i.e., "Private" may be a user-configurable option made within the hotel app 128.

Another beneficial application of system 100 includes allowing the hotel guest to receive incoming calls on both the in-room phone and/or their mobile phone. This may be beneficial for instance to receive calls dialed to their guest room's phone even when they are not physically located within the room. For instance, the concierge may call room No. "101" and connect with the guest to provide tourist information while the guest is physically enjoying a meal at the hotel's restaurant or any other location in the city providing network connectivity. As long as the restaurant area or other location has wireless connectivity to hotel LAN 108 and the user brings their user device 110, the ring group 124 set up at step 210 will cause the SIP client 130 to also be notified of calls to the user's registered hotel room. Again, this service and ability to twin calls to the user's assigned room to also ring at the SIP client 130 on the user's device 110 may be monetized by charging an additional fee by the hotel. As a further benefit, the ring groups will also work even if the user device 110 is not on the hotel property. Again, regardless of the location of the user device 110, as long as network connectivity is available such as when at any free or public hotspot or mobile data network, the user of the user device 110 may receive calls made to their hotel room's extension. Technically speaking, this not only works at the hotel's restaurant or any other location in the city but also anywhere in the world. For instance, consider the scenario of someone staying at a hotel in a city such as Calgary who travels (1.5-hour drive) to the city of Banff for a day trip. This person would still be reachable while in the city of Banff as long as their mobile phone had data, either WI-FI from a restaurant or other hotspot, or cellular data. Further, similar benefits apply to direct calls made to the user's temporary extension 122, 140 even if ring groups 124, 42 are not utilized.

As an added benefit, the SIP client 130 may also be notified of incoming calls via a push notification or other message sent via message server 144. In this way, the hotel app 128 does not need to be open or running on the user device 110 at the time of the incoming call. Instead, as long as the SIP client 130 has already been configured at step 212 to log in to the SIP phone system server 118, 138, the user device 110 will receive an incoming call notification message (e.g., push notification message) in response to an incoming call. The operating system on the user device 110 will again automatically open the hotel app 128 to deliver the message and the app 128 can immediately start the user device 110 ringing to signal the incoming call to the user. The user can press and "answer" button on the display screen of the user device 110 to answer the call just like a regular SIP client or cell phone user interface.

The incoming call notification message may also be utilized in some embodiments to send the login credentials similar to as described above for step 212. For instance, for load balancing or failover recovery, the network address of the SIP phone system server 118, 138 may change over time. If the change is only temporary, the user device 110 may not need to be notified unless there is an incoming call to the user device 110 (and/or an outgoing call from the user device 110). Upon an incoming call event occurrence, the SIP phone system server 118, 138 may send a notification message both informing the user device 110 of the incoming call event and informing the user device 110 of the new login credentials and network address or other required details of the SIP phone system server 118, 138. Sending the login credentials in an incoming call notification message may be the preferred mechanism to configure or reconfigure the app 128 if the user device 110 is only ever going to receive incoming calls and cannot be utilized to make outgoing calls. In this way, if there is never an incoming call for a particular user device 110, network traffic is reduced and battery life extended by avoiding configuring the user device 110 and requiring the user device 110 to log in to the SIP phone system server 118 unnecessarily.

At step 214, the SIP association server 120, 132 determines whether a predetermined expiry event has occurred. Examples of expiry events that may be utilized include receiving a message from the PMS 112 that the user associated with user device 110 has now checked out, that the room associated with the user device 110 is now vacant, that a predetermined checkout time has now been reached, that a predetermined number of incoming and/or outgoing SIP calls have been received/made, that the user has manually logged out of the SIP client 130 and/or hotel app 128, etc. In response to the expiry event occurring, control proceeds to step 216 to delete the user's communication account; otherwise, no action is taken and the SIP client 130 remains logged in and ready to receive/make calls.

At step 216, the SIP association server 120, 132 again accesses the SIP phone system server 118, 132 and deletes the communication account previously created at step 208. Step 216 may also involve the SIP association server 120, 132 deleting the temporary extension 122, 140 associated with the now deleted communications account, or the temporary extension 122, 140 associated with the now deleted communications account may be automatically deleted by the SIP phone system server 118, 138 because the communications account associated with the temporary extension 122, 140 no longer exists. Likewise, step 216 may also involve the SIP association server 120, 132 deleting the ring group 124, 142 associated with the now deleted communications account, or the ring group 124, 142 may simply be automatically deleted by the SIP phone system server 118, 138 since at least one group member no longer exists. In particular, the temporary extension 122, 140 associated with the now deleted communications account no longer exists so the ring group contains an invalid extension.

As a result of step 216, the SIP client 130 is no longer able to log in to the SIP phone system server 118, 138 and can therefore neither place calls nor receive SIP calls. A deconfiguration message may also be sent to the user device 110 by the SIP association server 120, 132 in order to clear out the now invalid configuration settings for SIP client 130 at step 216. For example, a silent push notification message with deconfiguration instructions may be sent to the device token associated with the device ID of the user device 110 received at step 200. An expiry date may also have been sent with the original SIP setup to the device 110. The device 110 can then also use this to let the user know that their session is expired. Likewise, rather than expressly sending an expiry message, in some embodiments, upon foregrounding the app 128, the app 128 checks with the SIP association server 120, 132, the SIP phone system server, or another device in the system 100 to ensure it still has access.

At step 218, because the device ID received at step 200 is not associated with any device communication token, the SIP association server 120, 132 sends a message to the HSIA gateway server 106 in order to send a message to the user device 110 informing the user of the availability of the SIP phone services at this hospitality establishment 102 and invites the user to install and/or log in to the hotel app 128. The fact that there is no token associated with the device identifier may mean that the user has never installed, run, or logged in to the hotel app 128 on user device 110. For this reason, the HSIA gateway server 106 or another server in system 100 such as a login portal attempts to get the user to install and log in to the hotel app 130 on the unrecognized user device 110. A special type of link or redirect message causing the user device 110 to either open, install, or redirect to the app 128 may also be sent at step 218.

At step 220, the SIP association server 120, 132 checks to see whether it has now received the device communication token from the hotel app 128 running on user device 110. This will occur in the event the user has followed the instructions of the notification message displayed at step 218 and installed or run the hotel app 128. Upon execution, the hotel app 128 looks for a SIP association server 120, 132 either locally on the hotel LAN 108 or a cloud-based on the Internet 104. If found, the hotel app 128 transmits its device communication token to the SIP association server 120, 132. If a device communication token is now received from the hotel app 128, control proceeds to step 222; otherwise, control proceeds to step 224.

At step 222, the SIP association server 118, 132 stores a mapping of the device ID received at step 200 with the corresponding device communication token received at step 220 in the device-to-token database 121, 136. Control then continues to step 206. From this point on, the device identifier received at step 200 (e.g., MAC address of the user device 110) is mapped to the device communication token (e.g., push notification token) for the hotel app 128 on the user device 110. Upon future instances of step 204 such as when the user device 110 arrives at another hotel 102 employing system 100, the SIP association server 120, 132 will find the user device's 110 MAC address (or other device identifier) is associated with the device communication token added to the device-to-token table 121, 136 at step 222.

In some embodiments, the device identifier (e.g., MAC address) at step 200 is temporarily stored along with the room number in an authorization queue. The point of storing the device identifier at step 200 is so it can be retrieved later after the device to token mapping has been completed at step 204 since that process may happen asynchronously. In the scenario where the mapping is not already set up, the mapping will thereafter be created at step 222 and then the authorization queue can be utilized. In the scenario where the mapping is already set up, (e.g., "yes" branch from step 204), the authorization queue is stored at step 200 but then immediately used since the mapping to token is already done.

Except for when a new user installs and runs the hotel app 128 at step 218, all the above steps may proceed automatically without user interaction as the user travels to different hospitality establishments 102. As long as the device identifier of the user device 110 is associated with a device communication token of the hotel app 128, the hotel app 128 will automatically be associated with a new SIP communication account each time the user arrives at a new hotel 102 (step 204). The SIP client 130 will be automatically configured with the login credentials of the communication account (step 212) and all this association and configuration will occur behind the scenes without requiring user involvement. After the process of FIG. 2 reaches step 212 at each hotel property 102, the user will begin receiving incoming calls that are directed to their room's in-room phone via the SIP client 130 on their mobile phone 110. Likewise, the user can open the hotel app 128 and make calls from the SIP phone system server 118 via the SIP client 130 on their mobile phone 110. In some embodiments, the user will have the ability to make calls within the local calling area of each hospitality location without roaming charges as the user moves from location to location during a business trip or other travel. Other types of user devices 110 such as tablets and laptop computers may be utilized by users within system 100 and receive the same benefits. Any digital devices may be utilized as a user device 110; for example, TVs could be used in combination with a microphone, STBs could be used in combination with a TV and microphone (such as an xbox®), etc.

Although the above embodiment of FIG. 2 has focused on leveraging push notification messages to automatically configure a SIP client on a user device 110, other embodiments such as illustrated in FIG. 3 are also possible to similarly configure an app 128 on the user device 110 to utilize any type service provided by the hospitality establishment.

FIG. 3 is a flowchart of steps of an automatic room association and app configuration process for simplifying the configuration of an app 128 such as an in-room control application running on a user's device as the user moves between different hospitality establishments 102 according to an exemplary embodiment. The steps of FIG. 3 may be performed by the one or more processors of a control server such as an association server 120, 132 or other server acting as the control server such as the HSIA gateway server 106 in FIG. 1. The steps of the flowchart are not restricted to the exact order shown, and, in other configurations, shown steps may be omitted or other intermediate steps added.

The process begins at step 300 when a component such as the control server receives a device identifier such as a MAC address from the user device 110.

The device identifier may be sent to the control server directly by the user device 110. For instance, upon a guest arriving at the hotel and connecting their user device 110 to the hotel's LAN, an app 128 (e.g., in-room control app/ phone SIP client app/entertainment app/etc.) running on the user device 110 may recognize the hotel LAN by checking for the existence of the control server. This may be done by the app 128 making a multicast domain name service (mDNS) query to determine whether there is a server on the hotel LAN that is acting as the control server or another type of association server. In another example, the control server may periodically and/or repeatedly broadcast/multicast an announcement of its existence to devices on the hotel LAN. Upon detecting the existence of the control server, the app 128 sends the MAC address of the user device 110 to the control server.

The app 128 may already know its MAC address or be able to directly retrieve the MAC address or other device identifier of the user device 110 from the operating system and/or the underlying communication hardware in order to send to the control server at step 300. Android™ devices for example can get their own MAC addresses within the app 128. Alternatively, the user device 110 may query another device on the LAN such as querying the control server to ask the server to report back the MAC address of the user device 110. The control server or another device on the LAN sends back the MAC address to the user device 110 in response to the query. The MAC address may then be stored within the app 128 so that going forward the app 128 can always directly report its MAC address to the control server at step 300. Thereafter, the MAC address along with a device communication token of the user device 110 (described further below) may both be reported to the control server by the app 128 upon first arrival at the hotel and/or upon the app 128 being run for the first time. This may occur at either or both of steps 300 and/or 320 of FIG. 3.

The app 128 running on a suitable mobile operating system such as Android could also be run outside of the hotel at a local off the hotel LAN for the first time, for example at the user's home. The app 128 at that point it is first run could send both its MAC address (or other device identifier) and its device communication token to a cloud based association server 132 on the Internet for storage in a device-to-token table 136, for example. Once at the hotel and on the local LAN, the guest's user device 110 will be seen by the control server such as when the user device 110 makes a DHCP request or sends other network traffic on the local LAN. The control server thereby receives the MAC address of the user device 110 and queries the cloud association server 132 with the MAC address to retrieve the already stored and associated device communication token for the user device 110.

In other embodiments, the app 128 and/or the user device 110 does not need to be involved in sending the MAC address at step 300 upon connection of the user device 110 to the hotel LAN. Instead, the MAC address or other device identifier of the user device 110 may be sent to the control server by a source different than the user device 110. In an exemplary embodiment, when the user of the user device 110 logs in at a login portal of an HSIA gateway server 106, the HSIA gateway 106 determines the MAC address of the user device 110 by inspecting network traffic received from the user device 110. The gateway 106 then informs the control server of the MAC address of the user device 110.

Having the local gateway 106 at the hotel detect the MAC address of the user device 110 may be particularly beneficial in embodiments utilizing Apple® iOS® based devices in conjunction with a cloud based association server 132. iOS® currently does not allow apps to determine the MAC address of the user device on which the app 128 is running. Likewise, a cloud-based association server 132 cannot usually see the MAC address of the user device 110 only by inspecting packets sent by the user device 110 because the packets have traversed the Internet and the originating MAC address is lost. For this reason, the local HSIA gateway server may extract the MAC address of the user device 110 from local network traffic sent by the user device 110 on the hotel LAN and then transmit the detected MAC address to the cloud association server 132 and/or the local control server. As another benefit, when another device such as the HSIA gateway server reports the MAC address (or other device identifier) of the user device, it is not required that the app 128 be running on the user device 110 at the time the user device 110 arrives or is utilized on the hotel LAN.

At step 302, the control server and/or association server 132 searches a device-to-token table 121, 136 in order to try and find whether the MAC address (or other device identifier) received at step 300 is currently associated with any device communication token. The device-to-token table 121,136 includes a mapping of device identifiers such as MAC addresses of user devices 110 to device communication tokens. In some cases, each MAC address may be associated to a single, unique device communication token. Alternatively, each MAC address may be associated with multiple device communication tokens as the tokens will be different per app on that device 110. Device communication tokens include well-known push notification tokens utilized to address push notification messages to a particular instance of an application running on a particular mobile device and for which a particular user is currently logged in. For instance, Apple®, Google®, and Microsoft® all have push notification tokens allowing developers to push notification messages via their respective push message servers in order to send messages to and notify app users of relevant events. As push notification tokens and the methods of sending push notification messages using these tokens on various app platforms are well understood in the art, further description is omitted herein for brevity. Other types of device communication tokens instead of or in addition to push notification tokens may be utilized in other embodiments. For example, any type of address for uniquely identifying a particular instance of the app 128 associated with a particular user may be employed as the device communication token in other embodiments.

At step 304, the control server and/or association server 132 determines whether there is a particular device communication token associated with the MAC address (or other device identifier) received at step 300. When yes, control proceeds to step 306; otherwise, control proceeds to step 318.

At step 306, the control server determines the user's registered hotel room. There are number of ways this may be done in different embodiments.

A user-to-room table utilized by a login portal to correlate guest devices brought to the hotel with registered rooms at the hotel. For instance, the user device 110 may be brought to the hotel by a guest who is assigned to a particular room. When the guest utilizes user device 110 to sign in at a login portal provided by the HSIA gateway server, the gateway server may confirm the guest's identify with the PMS and store a record of the guest room as being associated with the user device 110 in the user-to-room table (may be stored in the same database as the device-to-room table 116).

Given the MAC address (or other device identifier), the HSIA gateway server may simply look up the user's registered guest room from the user-to-room table. As previously mentioned, users may be required to log in at the HSIA gateway in order to obtain Internet access. Part of the log in process may involve the user inputting their room number. Authentication performed by the login portal may involve confirming the user's last name or other personal identification information matches the currently registered room of the specified room number in the property management system (PMS). This type of authentication is referred to as "PMS authentication" and is well known in the art of high speed Internet access for hospitality establishments. Since the HSIA gateway server has already performed PMS authentication as a part of the HSIA login process, the gateway may store a record of the room number with which each user device is associated. The gateway may then send a room number message to the control server either together with the MAC address at step 300 or separately such as when the MAC address is provided at step 300 by another device different than the gateway.

In other embodiments, the control server queries one or more other devices in order to determine the room number associated with the MAC address (or other device identifier) received at step 300. For instance, the control server may query a device-to-user database (not shown) in order to lookup the last name or other personal identification information of the user that is associated with the MAC address (or other device identifier) received at step 300. For instance, user devices may be mapped to user full names, loyalty program identifiers at a user profile server. Once the user's name or other identifying information is found, the control server may query the property management server (PMS) at the hotel in order to look up which room number is associated with that user. In yet other embodiments, the control server queries the gateway at the hotel in order to ask for the room number associated with the MAC address (or other device identifier) received at step 300.

At step 312, the control server sends a configuration message to the to the app 128 running on the user device 110. The configuration message is sent in some embodiments by the control server first generating a push notification message including those details, and the push notification message is transmitted to the user device 110 through an external notification service accessed via a message server. The notification message is addressed by the device communication token determined at step 304 such that it will be received only by the app 128 installed on the user device 110. A silent notification message may be utilized such that the message does not show on the user device 110 to the user. In some embodiments, the notification message further includes a network address (e.g., Internet Protocol IP address) of the control server at the hotel where the user device is now registered.

Upon receipt of the notification message, the operating system on user device 110 automatically activates the app 128 in order that the app 128 can receive the notification message. This is beneficial because the user is not required to manually open the app 128. As long as the app 128 is installed on the user device 110 and the user's login state is preserved with the app 128, the notification service will deliver the notification message to the user device 110 when network connectivity is available, and the user device 110 will deliver the message to the app 128.

Any required login credentials and/or other setup information related to the room control functionality and associated room/user/target device details may also be sent at step 312 utilizing other types of messages in addition to or instead of push notification messages in some embodiments. For instance, any desired method of sending messages to an app 128 may be utilized at step 312 such as background message services, push messages, messages pulled or otherwise retrieved by the user device 110, etc. In general, configuration data enabling the app 128 to become aware it is associated with a particular guest room and to know which types and numbers of IoT devices are available for remote control in that room is sent from a server such as the control server to the user's device 110 so that it can be received by the app 128 on the user device 110. The message with the required configuration data may be sent directly over the Internet and/or hotel LAN, or may involve transmission via an external messaging server.

Upon receiving the configuration message, the app 128 automatically configures itself and may present the room control UI screen to the user or may present a notification message to the user that room control functionality is now available.

At step 314, the control server determines whether a predetermined expiry event has occurred. Examples of expiry events that may be utilized include receiving a message from the PMS that the user associated with user device 110 has now checked out, that the room associated with the user device 110 is now vacant, that a predetermined checkout time has now been reached, that the user has manually logged out of the app 128, etc. In response to the expiry event occurring, control proceeds to step 316 to remove the user-to-room association; otherwise, no action is taken and the user is able to make in-room IoT device state changes as desired. An expiry date may also have been sent with the original app configuration at step 330 to set up the device 110. The device 110 can then also use this to let the user know that their session is expired. Likewise, rather than expressly sending an expiry message, in some embodiments, upon foregrounding the app 128, the app 128 checks with another device in the system 100 to ensure it still has access.

At step 316, the control server deletes the association of the user device 110 with the guest room from the user-to-room table.

At step 318, because the device ID received at step 300 is not associated with any device communication token, the control server sends a message to the HSIA gateway server in order to display a message to the user informing the user of the availability of the in-room control services at this hospitality establishment 102 and invites the user to install and/or log in to the app 128. The fact that there is no token associated with the device identifier may mean that the user has never installed, run, or logged in to the app 128 on user device 110. For this reason, the HSIA gateway server 106 or another server in system 100 such as a login portal attempts to get the user to install and log in to the app 128 on the unrecognized user device 110. A special type of link or redirect message causing the user device 110 to either open, install, or redirect to the app may also be sent at step 318.

At step 320, the control server checks to see whether it has now received the device communication token from the app 128 running on user device 110. This will occur in the event the user has followed the instructions of the notification message displayed at step 318 and installed or run the app 128. Upon execution, the app 128 looks for a control server for room control services. If found, the app 128 transmits its device communication token to the control server. If a device communication token is now received from the app 128, control proceeds to step 322; otherwise, control proceeds to step 324.

At step 322, the association server 132 stores a mapping of the device ID received at step 300 with the corresponding device communication token received at step 320 in the user-to-token table. This step may involve the control server first sending the device ID and the device communication token to the association server 132 for storage. Control then continues to step 306. From this point on, the device identifier received at step 300 (e.g., MAC address of the user device 110) is mapped to the device communication token (e.g., push notification token) for the app 128 on the user device 110. Upon future instances of step 304 such as when the user device 110 arrives at another hotel 102 employing system 100, the control server will find the user device's 110 MAC address (or other device identifier) is associated with the device communication token added to the user-to-token table at step 322.

In some embodiments, the device identifier (e.g., MAC address) at step 300 is temporarily stored along with the room number in an authorization queue. The point of storing the device identifier at step 300 is so it can be retrieved later after the device to token mapping has been completed at step 304 since that process may happen asynchronously. In the scenario where the mapping is not already set up, the mapping will thereafter be created at step 322 and then the authorization queue can be utilized. In the scenario where the mapping is already set up, (e.g., "yes" branch from step 304), the authorization queue is stored at step 300 but then immediately used since the mapping to token is already done.

Except for when a new user installs and runs the app 128 at step 318, all the above steps may proceed automatically without user interaction as the user travels to different hospitality establishments 102. As long as the device identifier of the user device 110 is associated with a device communication token of the app 128, the app 128 will automatically be configured for in-room control or other functions of the user's room each time the user arrives at a new hotel 102 (step 304). This association and configuration will occur behind the scenes without requiring user involvement.

Concerning security of the in-room control functionality, the above flowcharts of FIG. 3 may be modified such that, in other embodiments, the control server or another device sends a randomly generated key to each user device 110 via the notification token system (Apple Push Notification Service for example). This may be done periodically and/or when an IoT change command is sent from a user's device 110 and received by the control server, for example. The user device 110 receives the key and sends it back to the control server for verification. The key may be included along with the state change message or may be sent within a predetermined time after a state change message is sent to the server. The control server compares the most recently generated key for that user device 110 with the key that was received from the user device 110 in order to verify that the user device 110 from which the state change message was received at step 320 is actually the correct user device 110. In this way, the user's device is verified by the server to actually be sending the command and not a hacker who spoofed the IP and/or MAC of that user's device 110.

The above-described persistent room association and configuration processes illustrated FIG. 3 shows how push notification messages may be utilized to automatically configure a user device 110 upon that user device 110 arriving at a hospitality establishment. A similar process may be generalized to both start at any particular starting event occurrence and to configure any type of application 128 running on the user device 110 along with required servers on the LAN 108 and Internet 104 for any desired service offering. For instance, besides automatically configurating IoT room control functionality on the app to be activated at step 330 and to be deactivated at step 332 as described above, a phone SIP client running on the user device 110 may be automatically configured at step 330 via push notification message upon arrival of the guest at the establishment having SIP phone services. Likewise, an Asterisk server on the hotel LAN/Internet may also be configured at step 330 as required to work in conjunction with the app 128 on the user device 110. The app 128 on the user device 110 along with the Asterisk server components may then be reconfigured at step 332 to deactivate the SIP phone service for the user (see specific example of the SIP client/Asterisk configurations shown in FIG. 2). In yet another example, a video streaming application running on the user device 110 and one or more VOD server(s) may be automatically configured at step 330 with the login credentials to display content that is available to the registered room associated with the owner of the user device 110. Likewise, the VOD app 128 and/or servers may be automatically configured at step 332 to prevent the user device 110 from using the VOD media content.

To increase security on networks that may have malicious users, a modification to steps 222 and 322 is made in some embodiments to require the user to successfully complete a challenge-response transaction prior to adding the mapping of the device ID and the token to the device-to-token table 121, 136.

To first explain the risk—a malicious device on the network could spoof the MAC address and IP of a recently logged-in user device 110. If the recently logged-in user has never opened the app 128 and therefore never had their device ID to token mapping performed (i.e., determination at step 204/304 is "no"), then the hacker could do it on their behalf with the hacker's token(s). The hacker would have to monitor traffic such as on an open/unencrypted wireless network 108 and then look for new MAC addresses and IP addresses connecting to the network 108 and see the exchange between this new device 110 and the HSIA server 106. Although the communications between the gateway 106 and the user device 110 would be SSL so the hacker could not see the data, the hacker could see the headers and make an educated guess that this user device 110 was performing an HSIA login. If this user device 110 does not open the app ("no" at steps 220/320) and then eventually disconnects from the network 108, the hacker could then at this point spoof the MAC and IP and open the app 128. Without any additional security measures, this action by the hacker would associate the hacker's device with the room because the result of step 220/320 would be "yes" from a user device 110 that appears on the network 108 exactly the same as the user's device 110 but is actually under the hacker's control. The hacker could thereafter use the app 128 functionality as if they were the real user. Depending on the functions provided by the app 128, this could mean the hacker could make/receive calls or perhaps make changes to the temperature of the room or flick the lights on and off in the middle of the night. These actions by a hacker would be annoying to the real guest to say nothing of the violation of privacy and security.

In some embodiments, a challenge security measure to prevent the above problem is implemented as follows. Data that is captured by and/or stored in the HSIA system is used to verify the identify of the user operating the app after the "yes" occurs from step 220/320 and prior to storing the mapping at steps 222/322. In other words, the security measure involves sending a challenge request to the app 128 if the device 110 is not mapped to a token in the DB prior to updating the device-to-token table 121, 136. The challenge request causes the user device 110 to open a popup alert in the app 128 requesting information from the user to confirm the user is the original person who logged into the HSIA system 106. For instance, the SIP association server 118, 132 could check to see that a specific room number and last name was used to authenticate that user device 110 when it was logged into the HSIA server 106 and ask for this information from the app 128. The app 128 would then require the user to enter this same information in a popup window. In one scenario, after logging in to the HSIA server 106, the user would have to again put in their last name and room # but now in the challenge pop window from the app 128. The device to token association would only be done at step 222/322 when the information entered by the user in the challenge popup window matches that stored in the HSIA server 106. When the information matches, this means the user is a validated user. Again, this challenge would only have to be done once for that user and device 110. For any future stays at that hotel or any other hotel, the device-to-token mapping would already be stored in the database 121, 136 (which will result in the "yes" branch of step 204/304).

In addition to personal information like last name and room number utilized to log in to the HSIA server 106, any other information that is likely to be known to the valid user while not known to a hacker could be verified using a challenge popup from the app 128 in a similar manner. For instance, another option is to use a connect code or other passkey that is displayed on an in-room media device such as the TV, for example. This connect code could be the same code that is utilized for the user to associate their device 110 with the room as part of a login process for another service such as room control at the hotel. Since it is only visible to valid users who can enter and gain access to the room, a hacker would not know the proper challenge answer. Any data could be verified including PMS data, HSIA data, guest personal data, along with room specific data that is only to people who have physical access to the room such as connect codes and passkeys. This data can be pulled from the cloud HSIA DB or the local HSIA DB. The SIP association server 118, 132 checks for certain available data and then decides on which data to use, one or multiple chunks of that data, and sends as a challenge to the app 128. The app 128 creates a popup on the screen (in the app 128) for the user to fill out the information. The inputted information is then sent back to the server 118, 132 and authenticated. A valid or failed response is then sent back; if valid, the mapping update actions at step 222/322 are performed by the SIP association server 118, 132.

Although the invention has been described in connection with preferred embodiments, it should be understood that various modifications, additions and alterations may be made to the invention by one skilled in the art without departing from the spirit and scope of the invention. For example, although relational database tables are envisioned as being particularly useful for quick lookups, the term "database" as used herein refers to any collection and organization of stored data. Although the software application 128 has often been referred to herein as "hotel app 128", it is to be understood that any predetermined application 128 may be used and it is not a requirement that the app 128 be owned or distributed by the hotel itself. For instance, an information technology service provider may develop and manage the app 128 and simply rebrand it and deploy it for use at different hotels and hospitality establishments 102.

Although the above-description has focused on the system 100 deployed at a hotel 102, this is for illustration purposes and the present invention is equally applicable to any hospitality related location or service wishing to provide a wireless hotspot including but not limited to hotels, motels, resorts, hospitals, apartment/townhouse complexes, restaurants, retirement centers, cruise ships, busses, airlines, airports, shopping centers, passenger trains, libraries, coffee shops, hotspots, etc. Additionally, in addition to the above described hospitality examples, the invention is applicable outside the hospitality industry such as when a home or corporate entity desires to automatically associate and set up SIP clients 130 for user devices 110.

The flowchart described above in FIG. 2 includes several steps related to hotel rooms such as determining the user's registered room at step 206 and creating the ring group with the in-room phone extension in that room at step 210. However, in other embodiments, a modified version of the flowchart of FIG. 2 may be utilized at other types of hospitality or business locations where the users are not assigned locations such as rooms with location-specific phone extensions such as in-room phones. For instance, a coffee shop or coffee shop chain that serves tourists may offer system 100 in order to allow customers to make local calls in the vicinity of one or more coffee shops without the customers incurring roaming charges or other cell phone fees. Each coffee shop may offer a local wireless network 108 accessible to customers. There may or may not be a fee for access to the LAN 102. The coffee shop or its chain may also offer a software application 110 including a SIP client 130. The process of FIG. 2 would then proceed generally as described above, except that steps 206 and 210 are omitted. In this way, the customers can make local calls to destinations around the coffee shop utilizing SIP client 130 in order to avoid mobile network roaming charges. Incoming calls may not be offered in some embodiments; alternatively, incoming calls may still be offered such that if a customer makes an outgoing SIP call, the caller ID will be a direct dial phone number mapped to the temporary extension 122 for the user's communication account. In this way, if the customer calls a destination, the destination may call the user back by dialing the caller ID number and the call is connected by the SIP phone system server 118, 138 to the customer's SIP client 130. Similar modifications may also be made to FIG. 3 to suit other venues and applications in further embodiments.

Although the above description as focused on Internet telephony communication protocols such as SIP, the invention is not limited to only SIP. In other embodiments, different types of communication protocols and communication severs may be utilized in a similar manner. For instance, a real-time text messaging account may be created for the user device at step 208 and a real-time text messaging client running on the user device 110 may be configured with login credentials at step 212.

In an advantageous embodiment, an association server 120, 132 in a communication system 100 receives a device identifier of a user device 110 and searches a device-to-token database 121, 136 in order to determine whether the device identifier is currently associated with any device communication token. In response to determining that the device identifier is associated with a device communication token, the association server 120, 132 creates a communication account for the user device 110 on a communication server 118, 138, and sends a login credential for the communication account to the user device 110 in a message transmitted via an external message server 144. The message is addressed by the device communication token to a predetermined application 128 installed on the user device 110. The predetermined application 128 on the user device 110 receives the message from the notification service 144, and thereafter automatically logs in to the communication server 118, 138 according to the login credential included in the message.

The above components may be implemented by software modules executed by one or more processors operating pursuant to instructions stored on a tangible computer-readable medium such as a storage device to perform the above-described functions. Examples of the tangible computer-readable medium include optical media (e.g., CD-ROM, DVD discs), magnetic media (e.g., hard drives, diskettes), and other electronically readable media such as flash storage devices and memory devices (e.g., RAM, ROM). The computer-readable medium may be local to the computer executing the instructions, or may be remote to this computer such as when coupled to the computer via a computer network such as the Internet. The processors may be included in a general-purpose or specific-purpose computer that becomes the association server 118, 138, control server, and/or any of the above-described components as a result of executing the instructions.

In other embodiments, rather than being software modules executed by one or more processors, the above functionality may be implemented as hardware modules configured to perform the above-described functions. Examples of hardware modules include combinations of logic gates, integrated circuits, field programmable gate arrays, and application specific integrated circuits, and other analog and digital circuit designs.

Functions of single modules and components may be separated into multiple units, or the functions of multiple modules may be combined into a single unit. For example, one or more of the SIP phone system server 118, 138; SIP association server 120, 132; and/or HSIA gateway server 106 may be combined into a single computer server providing all functionality.

Unless otherwise specified, features described may be implemented in hardware or software according to different design requirements. In addition to a dedicated physical computing device, the word "server" may also mean a service daemon on a single computer, virtual computer, or shared physical computer or computers, for example. All combinations and permutations of the above described features and embodiments may be utilized in conjunction with the invention.

What is claimed is:

1. An apparatus for enabling communication between a user device and a communication server, the apparatus comprising:
   a communication port;
   a storage device storing a plurality of software instructions; and
   one or more processors coupled to the communication port and the storage device;
   wherein, by the one or more processors executing the software instructions loaded from the storage device, the one or more processors are thereby configured to:
   receive a device identifier of the user device;

search a device-to-token database in order to determine whether the device identifier is currently associated with any device communication token;
in response to determining that the device identifier is not associated with any device communication token, send a message to the user device to thereby cause the user device to activate a predetermined application;
receive a device communication token of the predetermined application from the user device after the predetermined application has been activated;
store a mapping of the device communication token with the device identifier in the device-to-token database for future use, wherein the mapping represents an association of the device identifier with the device communication token that is utilized by the one or more processors in determining whether the user device is authorized to communicate with the communication server;
create a communication account for the user device on the communication server; and
send a login credential for the communication account to the user device in a notification message transmitted via a message server, the notification message addressed by the device communication token to the predetermined application on the user device;
wherein, the predetermined application on the user device receives the notification message from the message server, and thereafter automatically logs in to the communication server according to the login credential included in the notification message.

2. The apparatus of claim 1, wherein the one or more processors are configured to receive the device identifier by monitoring a local area network (LAN) for network traffic originating from the user device.

3. The apparatus of claim 1, wherein the message causes an operating system on the user device to automatically activate the predetermined application.

4. The apparatus of claim 1, wherein the message causes a user of the user device to manually activate the predetermined application.

5. The apparatus of claim 1, wherein the message is an invite to install the predetermined application.

6. The apparatus of claim 1, wherein the message is an invite to open the predetermined application.

7. The apparatus of claim 1, wherein the message is an invite to log in to the predetermined application.

8. The apparatus of claim 1, wherein as an extra layer of security, the user of the user device is required to successfully complete a challenge-response transaction prior to the one or more processors storing the mapping of the device communication token with the device identifier in the device-to-token database.

9. The apparatus of claim 1, wherein:
the communication server is a session initiation protocol (SIP) server providing SIP phone services; and
the predetermined application on the user device is a SIP client application that allows the user of the user device to place outgoing phone calls and receive incoming phone calls via the communication server.

10. The apparatus of claim 1, wherein when creating the communication account for the user device on the communication server, the one or more processors are further configured to assign a temporary extension to the communication account, the temporary extension utilized by the communication server to direct calls to and from the communication account.

11. A method of enabling communication between a user device and a communication server, the method comprising:
receiving a device identifier of the user device;
searching a device-to-token database in order to determine whether the device identifier is currently associated with any device communication token;
in response to determining that the device identifier is not associated with any device communication token stored in the device-to-token database, sending a message to the user device to thereby cause the user device to activate a predetermined application;
receiving a device communication token of the predetermined application from the user device after the predetermined application has been activated;
storing a mapping of the device communication token with the device identifier in the device-to-token database for future use, wherein the mapping represents an association of the device identifier with the device communication token and is utilized by one or more processors in determining whether the user device is authorized to communicate with the communication server;
creating a communication account for the user device on the communication server; and
sending a login credential for the communication account to the user device in a notification message transmitted via a message server, the notification message being addressed by the device communication token to the predetermined application on the user device;
wherein, the predetermined application on the user device receives the notification message from the message server, and thereafter automatically logs in to the communication server according to the login credential included in the notification message.

12. The method of claim 11, further comprising receiving the device identifier by monitoring a local area network (LAN) for network traffic originating from the user device.

13. The method of claim 11, wherein the message causes an operating system on the user device to automatically activate the predetermined application.

14. The method of claim 11, wherein the message causes a user of the user device to manually activate the predetermined application.

15. The method of claim 11, wherein the message is an invite to install the predetermined application.

16. The method of claim 11, wherein the message is an invite to open the predetermined application.

17. The method of claim 11, wherein the message is an invite to log in to the predetermined application.

18. The method of claim 11, wherein as an extra layer of security, the user of the user device is required to successfully complete a challenge-response transaction prior to storing the mapping of the device communication token and the device identifier in the device-to-token database.

19. The method of claim 11, wherein:
the communication server is a session initiation protocol (SIP) server providing SIP phone services; and
the predetermined application on the user device is a SIP client application that allows the user of the user device to place outgoing phone calls and receive incoming phone calls via the communication server.

20. The method of claim 11, further comprising assigning a temporary extension to the communication account, the temporary extension utilized by the communication server to direct calls to and from the communication account.

* * * * *